INVENTORS
PIERRE CHADENSON
RENÉ AVENIER
JEAN LATHUILE
BY
John J. Hart
ATTORNEY

United States Patent Office 3,564,926
Patented Feb. 23, 1971

3,564,926
APPARATUS FOR AND METHOD OF MEASURING THE MEAN SPECIFIC GRAVITY OF A LIQUID
Pierre Chadenson, La Tronche, Isere, René Avenier, Les Rieux-Montbonnot-St.-Martin, and Jean Lathuile, Grenoble, Isere, France, assignors to Societe Generale de Constructions Electriques et Mecaniques (Alsthom), Paris, France, a corporation of the French republic
Filed June 24, 1968, Ser. No. 733,155
Int. Cl. G01n 9/00
U.S. Cl. 73—438                                   10 Claims

ABSTRACT OF THE DISCLOSURE

The apparatus includes an initial chamber in communication with the bottom of a tank containing the liquid to be measured and provided with means for maintaining the liquid in such chamber at a constant level, a column containing a reference liquid communicating at its bottom with a second chamber provided with means to maintain the reference liquid in such second chamber at the same level as the liquid in the initial chamber, ducting connecting the top of the tank with the top of the column, and connecting the tops of the two chambers, and means for measuring the liquid surface levels in the tank and column.

This invention relates to apparatus for and a method of measuring the mean specific gravity of a liquid, and more particularly to the static measurement of the mean specific gravity of a given volume of liquid between the free surface of the liquid and a given level below such surface.

In accordance with the invention, the apparatus is constructed to measure the free surface levels of the liquid and of a reference liquid above a horizontal reference level which is below such surface levels and common to both. By ensuring that the reference levels for the two liquids which go to make such common horizontal reference level, are maintained at the same elevation, the specific gravity of the liquid being measured can be determined from the ratio of the measured depths of the two liquids, as the density ratio is inversely proportional to such depth ratio.

Figure 1:
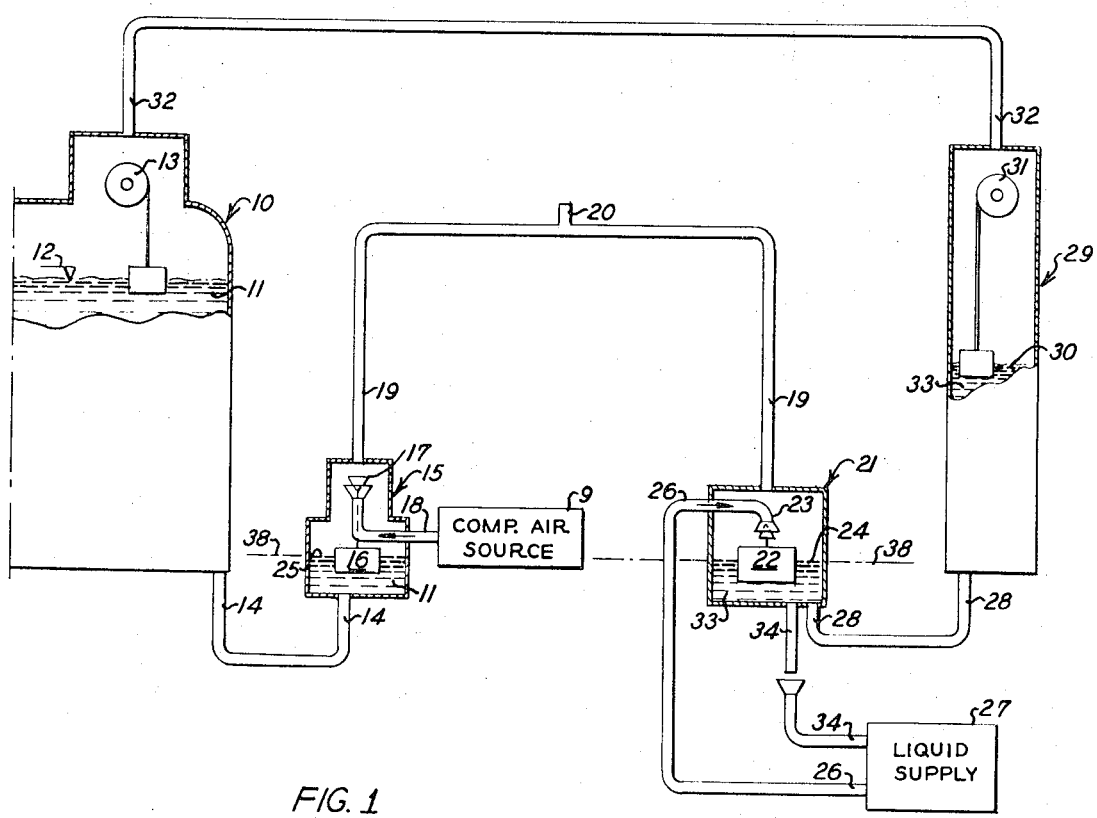
Figure 2:
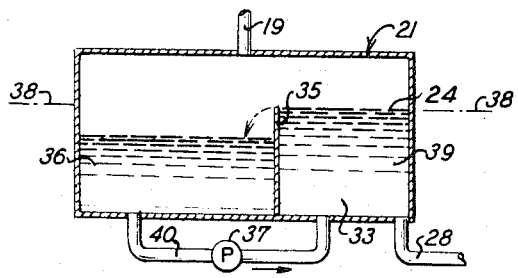

For a better understanding of the invention, reference is made to the following detailed description which should be read in connection with the accompanying drawings, in which:

FIG. 1 is a diagrammatic view of an improved means according to the invention for measuring the mean specific gravity of a liquid with respect to a reference liquid; and FIG. 2 is a diagrammatic view of a variant of a portion of the means illustrated in FIG. 1.

Referring now more particularly to FIG. 1 of the drawings, the reference numeral 10 designates generally a tank 10 containing the liquid 11 whose specific gravity is to be measured. The tank 10 is a closed tank and is in communication at its bottom by means of a duct 14 with a closed chamber generally designated 15 and located adjacently to the tank 10. The chamber 15 is relatively small and is positioned with respect to the tank 10 so that the level 25 of the liquid 11 therein is below the free level 12 of the portion of the liquid 11 in the tank 10. The liquid level 25 in the chamber 15 is for the purposes of this invention considered as a reference level and is maintained constant with respect to the free level 12 by means of a float 16 and a compressed air inlet valve 17 which controls the discharge of compressed air from a pipe 18. The compressed air to the pipe 18 is supplied from a source 9 of known construction and is discharged through the valve 17 into the upper portion of the chamber 15 above the liquid level 25. The upper portion of chamber 15 has connected thereto a pipe 19 which has a permanent air leak 20 and which brings such upper portion of chamber 15 into communication with the upper portion of a second chamber 21.

The bottom of the second chamber 21 is connected by a pipe 28 to the bottom of a closed column 29 containing a reference liquid 33. The reference liquid is supplied to chamber 21 through an inlet valve 23 located in the upper portion of such chamber above the level 24 of the portion of the reference liquid 33 contained in such chamber. The inlet valve 23 is provided on the discharge end of a pipe 26 which is connected at its other end to a reference liquid supply circuit 27 of usual construction. A pipe leading off from the bottom of chamber 21 conveys a permanent leakage flow from such chamber which is returned to the supply circuit 27. The discharge of the inlet valve 23 is controlled by a float 22 in the chamber 21.

It will be observed from the foregoing that the liquid levels 25 and 24 in the chambers 15 and 21, respectively, are subjected to the same air pressure which is supplied to chamber 15 through the valve 17 under the control of the float 16. The amount of reference liquid 33 in the chamber 21 is effected by the valve 23 under the control of the float 22. The settings and dimensions of the valves 17 and 23 and the floats 16 and 22 are calculated and adjusted so that the liquid levels 24 and 25 in the two chambers will always lie in the same given horizontal plane 38—38. The plane 38—38 constitutes the reference level from which the mean specific gravity of the liquid 11 in the tank 10 is measured.

The top part of the closed tank 10 is connected to the top part of the closed column 29 by a pipe 32 which ensures equal pressures above their respective fluid contents 11 and 33. The free surface level 12 of the liquid 11 in tank 10 whose mean specific gravity is to be measured is detected by a pick-up device 13 of known construction. The level 30 of the reference liquid 33 in column 29 is detected by a similar pick-up device 31.

It will be understood from the foregoing, that when the liquid 11 whose specific gravity is to be measured is at a level 12 in tank 10, the float 16 in chamber 15 controls the opening of valve 17 in such a way that compressed air from pipe 18 sets up a back-pressure above the surface 25 of the portion of the liquid 11 in such chamber such as to maintain the said surface at a constant level, with due allowance for the permanent air leak at 20. At the same time the liquid supplied to chamber 21 sets up a reference liquid level 30 in column 29 such that the pressure on surface 24 in chamber 21 balances the back-pressure of air above such surface from the pipe 19. This back-pressure on surface 24 has the same value as the back-pressure in chamber 15 above the liquid surface 25 therein, and the float 22 in chamber 21 sets valve 23 at the degree of opening required to maintain level 24 constant, with due allowance for the permanent reference liquid leak through the pipe 34. As previously indicated the settings and dimensions of valves 17 and 23 and floats 16 and 22 are such that the levels 25 and 24 will remain in the same horizontal plane, the reference plane 38—38.

Readings are then taken from the two pick-up devices 13 and 31 to determine the levels 12 and 30 of the two liquids 11 and 33 in the tank 10 and column 29, respectively, above the fixed reference plane 38—38. From these two measurements the mean specific gravity of the volume of liquid 11 in tank 10 above such reference plane 38—38 can be determined, since the density ratio of the two liquids is inversely proportional to the ratio between their depths above the said reference plane. Recycled distilled water at a temperature controlled to within a few degrees can be used as the reference liquid 33 if it is necessary to ensure the required accuracy.

When the level 12 of the liquid 11 in tank 10 changes, the air pressure above the surface 25 of the portion of such liquid in chamber 15 will no longer match level 12, with the result that a change of the liquid level 25 in chamber 15 will occur. Float 16 then moves valve 17 to modify the incoming air flow so that the air pressure in chamber 15 will match the new level 12, thereby causing level 25 to again coincide with the given reference plane 38—38. As the back-pressure on level 25 in the chamber 15 also finds its new value in chamber 21, it causes the level 24 of the portion of the reference liquid 33 in such chamber 21 to change. This change in the level 24 will cause the float 22 to react and move the valve 23 by the amount required to modify the water inflow through pipe 26 so that the level 30 of the reference liquid in the column 29 again coincides with the reference level plane 38—38.

As has been indicated, in making the above described measurements by the pick-up devices 13 and 31, the mean specific gravity of the entire volume of liquid 11 between the free surface 12 of such liquid and the given reference level plane 38—38 is measured. It will be understood, that if desired, the mean specific gravity of liquid 11 can be measured for other horizontal layers between its free surface 12 and any level above the bottom of the tank 10, by displacing the chambers 13 and 21 vertically by the amount required to make the reference plane 38—38 coincide with the bottom level of the horizontal layer of liquid 11 that it is desired to measure.

It will be understood, that FIG. 1 of the drawings illustrates by way of example one arrangement by which the invention herein may be practiced and that variations in such arrangement may be made without departing from the spirit of the invention or the scope of the appended claims. Thus, in the arrangement of FIG. 1, control of the reference levels may be effected by simultaneous action on the fluid inlets and outlets by means of float-controlled three-way valves. A level regulation loop with a connector circuit may also be used instead of the simple float valve system illustrated, as will be apparent to those skilled in the art. In the modified form of control shown in FIG. 2 of the drawings, the portion of the reference liquid 33 in chamber 21 which forms the reference level 24 is contained in a compartment 39 formed by a weir 35. The crest of the weir 35 is at the reference level, i.e. in the horizontal reference level plane 38—38. The reference liquid spills over the weir 35 into a compartment 36 from which it is returned through a pipe 40 connecting the bottoms of the two compartments, to the compartment 39 by a recirculating pump 37 capable of maintaining in the compartment 39 a constant level 24 equal to that of the weir crest 35, i.e., in the reference plane 38—38. The breadth of overflow on the weir should be sufficient to maintain level 24 practically constant despite the variations in the pump discharge and even though the pump may not be of the volumetric type.

What is claimed is:

1. Apparatus for statically measuring the mean specific gravity of a liquid between its free surface and a horizontal reference level plane below such free surface, comprising a container for the liquid to be measured, a first chamber in communication with said container below said reference level plane and containing a portion of the liquid to be measured, a column containing a reference liquid, a second chamber in communication with said column below said reference level plane and containing a portion of the reference liquid, means for simultaneously applying on the liquids in both said chambers pressurized gas capable of maintaining the level of the liquid in said first chamber constantly in said reference level plane, liquid control means for maintaining the level of the gas pressured reference liquid in said second chamber constantly in said reference level plane, and means for measuring the free surface levels of the liquids in said container and in said column.

2. Apparatus as defined in claim 1, including ducting for connecting the bottom of said container with the bottom of said first chamber, and for connecting the bottom of said column with the bottom of said second chamber.

3. Apparatus as defined in claim 1, in which said gas applying means comprises ducting connecting the top portions of said first and second chambers, a gas inlet in the upper portion of said first chamber, and means for controlling the flow of gas through said inlet.

4. Apparatus as defined in claim 3, in which said gas flow controlling means comprises a valve at said inlet, and a float on the liquid in said first chamber and connected to said valve so as to vary the latter according to variations in the level of the liquid.

5. Apparatus as defined in claim 1, in which said liquid control means comprises in said second chamber a reference liquid inlet and an outlet for such liquid separate from said column, and includes means for supplying a flow of liquid through said inlet.

6. Apparatus as defined in claim 5, in which said flow supplying means comprises a valve at said liquid inlet, and a float on the liquid in said second chamber and connected to said valve so as to vary the latter according to variations in the level of the liquid.

7. Apparatus as defined in claim 5, in which said reference liquid inlet and outlet and said flow supplying means form part of a closed reference liquid circuit.

8. Apparatus as defined in claim 1, in which said liquid control means comprises a weir located in said second chamber and having a crest at said reference level plane, and said liquid control means maintains the level of the reference liquid on one side of said weir constantly in said reference level plane.

9. Apparatus as defined in claim 1, including ducting connecting the portion of said container above the free surface of the liquid therein to the portion of said column above the free surface of the liquid therein.

10. Method of statically measuring the mean specific gravity of a liquid in a container between its free surface and a horizontal reference level plane below such free surface, comprising simultaneously applying on a portion of such liquid in a first chamber in communication with said container below said reference level plane, and on a portion of a reference liquid in a second chamber in communication with a column containing the reference liquid below said reference level plane, pressurized gas capable of maintaining the level of the liquid in the first chamber constantly in said reference level plane, maintaining the level of the gas pressured reference liquid in the second chamber constantly in said reference level plane, and measuring the free surface levels of the liquids in the container and in the column.

References Cited

UNITED STATES PATENTS

| 1,178,902 | 4/1916 | Brindle | 73—438 |
| 1,298,810 | 4/1919 | Sowden | 73—438 |
| 2,328,787 | 9/1943 | Davidson | 73—438 |

FOREIGN PATENTS

| 847,164 | 12/1938 | France | 73—32 |
| 806,497 | 6/1951 | Germany | 73—32 |

RICHARD C. QUEISSER, Primary Examiner

C. E. SNEE III, Assistant Examiner